Sept. 21, 1965  H. A. FULTON  3,207,170
DIAPHRAGM TYPE BALL COCK VALVE
Filed July 2, 1962
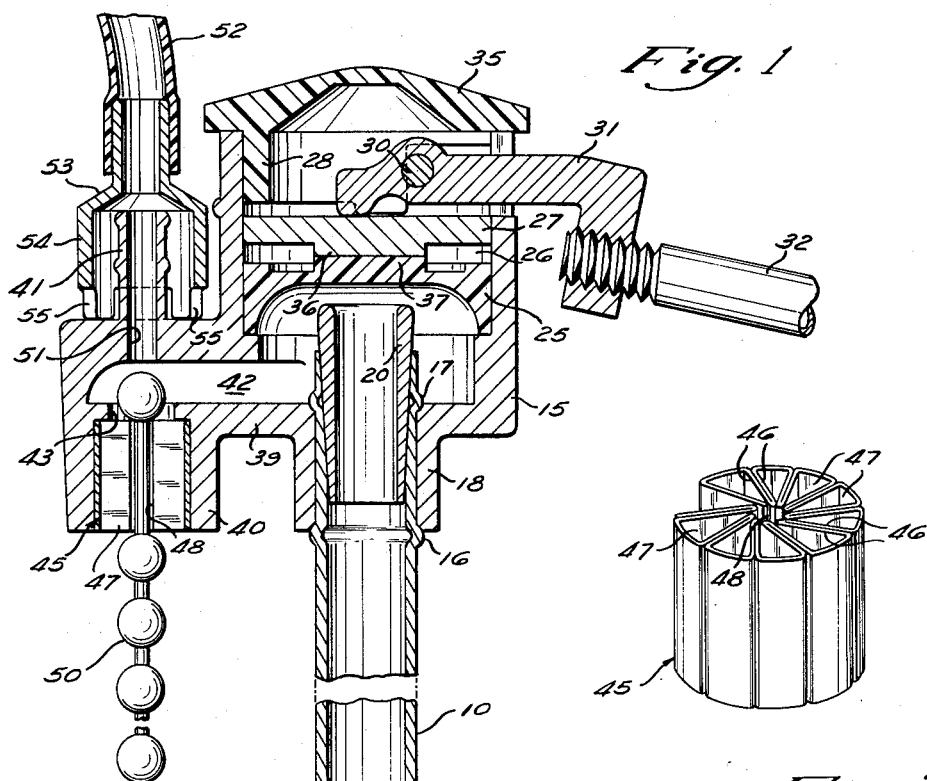
Fig. 1
Fig. 2
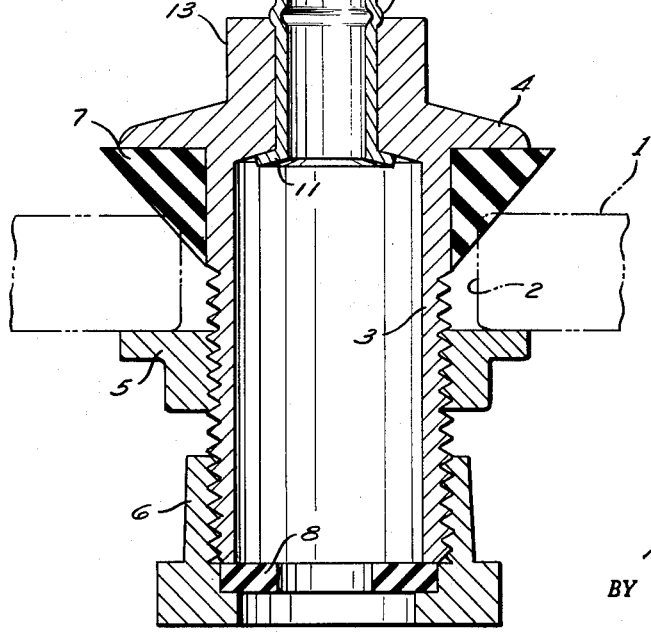
INVENTOR.
HOWARD A. FULTON
BY WATTS & FISHER
ATTORNEYS

United States Patent Office 3,207,170
Patented Sept. 21, 1965

3,207,170
DIAPHRAGM TYPE BALL COCK VALVE
Howard A. Fulton, Perrysville, Ohio, assignor to
Mansfield Sanitary, Inc.
Filed July 2, 1962, Ser. No. 206,635
4 Claims. (Cl. 137—216)

This invention relates to inlet valves for flush tanks of water closets and is particularly concerned with a low noise level, anti-syphon, ball cock valve of the diaphragm type.

Heretofore, efforts have been made to devise inlet valves having a low noise level and, to that end, hush pipes have been provided to conduct water discharged from the inlet pipe down through a hush pipe having an outlet close to the bottom wall of the tank. While these hush pipes served to reduce the noise level, they did add to the cost. As far as I am aware, no entirely satisfactory substitute for the hush pipes has been proposed.

Other efforts have been made to devise a ball cock valve which would automatically break any syphoning action through the refill pipe opening of the valve, but so far as I am aware, none of the expedients proposed for this purpose has been entirely satisfactory.

The present invention aims to satisfy both of the foregoing needs and achieves that aim by a new and unobvious combination of elements.

This invention will be better understood by those skilled in the art from the following specification and the accompanying drawings, in which:

FIG. 1 is a central, sectional, vertical view through a valve embodying the present invention; and FIG. 2 is a perspective view of the aerator, in partly open position, which is used in reducing the noise level of the valve.

In FIG. 1, the bottom wall of a flush tank is shown fragmentarily at 1. This wall is provided with the usual opening 2 therethrough for an inlet pipe. This inlet pipe includes an exteriorly threaded large diameter tube 3 having a flange 4 near its upper end, a nut 5 threaded near its mid portion and a coupling 6 at the lower end. A gasket 7 surrounds tube 3 and engages the lower side of flange 4. When nut 5 is screwed up into contact with the bottom side of wall 1, the gasket will be deformed by the annular surface at the intersection of the upper end of opening 2 and the upper surface of wall 1. Such deformation is made sufficient to prevent leakage of water out of the tank.

The coupling 6 serves to press a gasket 8 against the lower end of tube 3 and when a tube (not shown) extends through gasket 8, and coupling 6 is screwed up on tube 3, the gasket is deformed into tight contact with the tube and leakage of water between the tube and the gasket will be prevented.

At its upper end, tube 3 is provided with a thin walled pipe 10. This pipe is connected to tube 3 by being flanged outwardly, as at 11 at the lower end and crimped outwardly, as at 12, near the upper extremity of tube 3 thereby gripping portion 13 of the latter between these two deformations.

Near its upper end, pipe 10 is connected to a valve housing 15 by deforming the pipe as at 16 and 17 to grip the depending portion 18 of the housing therebetween. Within the upper end of pipe 10, an elongated tubular valve seat 20 is located. The outer surface of this seat 20 tapers inwardly toward its lower end and has a wedge or pressed fit in pipe 10. The upper open end of seat 20 is rounded for engagement with the diaphragm 25 which is disposed in a cylindrical, vertical chamber 26 in the housing. A disc 27 is slidably mounted in chamber 26. A pin 30 is mounted in holes in the sides of housing 15 above disc 27 and a lever 31 is mounted on this pin for pivotal movement induced by a conventional float ball (not shown) on float lever 32. The upper end of lever 31 engages disc 27 approximately on its center and directly above seat 20. A cap 35 serves to close the upper end of chamber 26 and is provided with a depending flange 28 which engages the inner surface of the wall defining chamber 26 except for the part on the lever side of pin 30. The edges of this flange 28 adjacent to pin 30 are extended slightly beneath the pin and these extensions afford a means for retaining the cap 35 in position.

The lower surface of disc 27 is provided with a downwardly extending portion 36 which engages a correspondingly sized portion 37 extending upwardly from the diaphragm 25 and that the diaphragm is of reduced section around portion 37. Thus, downward movement of the disc 27 caused by upward movement of the float ball in the tank will exert downward pressure on the raised portion 37 of the diaphragm and the portion of the diaphragm outside of portion 37 will flex and permit the diaphragm to engage the upper curved end of the valve seat, thereby preventing the flow of water through the inlet pipe.

The housing 15 has a hollow projection 39 extending laterally therefrom and provided near its outer end with a downwardly extending projection 40 and an upwardly extending projection 41. A chamber 42 in projection 39 is in communication with the chamber in the housing beneath the diaphragm 25.

The downwardly extending projection 40 is provided with a cylindrical opening 43 which communicates at its upper end with chamber 42. An aerator 45 is positioned in opening 43 and preferably is composed of a strip of springy metal folded repeatedly upon itself, as at 46, to form a plurality of vertical triangular passages 47 with a round opening 48 through the center of the aerator. A chain 50 consisting of a plurality of balls connected together extends through opening 48 to some distance below the aerator and is retained in position by engagement of one of the balls on the edges of the passage from chamber 42 into the passage 43.

The upward projection 41 has a passage 51 which communicates with chamber 42. A refill tube 52 is connected to a fitting 53 which has an enlarged lower end 54 surrounding projection 41 and having feet 55 resting on projection 39 with intervening cut away spaces. The upper end of fitting 53 is only slightly larger than the refill tube 52 and has an opening directly above the passage through projection 41.

The operation of the above described apparatus will be obvious to those skilled in the art but may be briefly described as follows. When the surface of water in the tank is low, as at the conclusion of the flushing operation, the lever 31 will be pivoted about pin 30 with resultant release of the pressure exerted by the lever on disc 27. Water under pressure will flow through inlet pipe 10 and out through seat 20 and thence through chamber 42. Part of that water will flow down through aerator 45 where it will be broken up into a plurality of small streams and from which it will be discharged along chain 50 with the latter serving also to break up the stream and conduct it smoothly downwardly. The noise of the stream will be lessened by reason of this aerating, dividing and smooth conduction of the stream of water.

At the time that water is flowing from chamber 42 through aerator 45, it will also be flowing up through passage 51 and into refill tube 52. Since this upward flow of water is in a small stream and at a considerable velocity, air will be drawn through holes 55 into the enlarged part 54 of fitting 53 and will flow upwardly around projection 41 and thence into the refill tube around the stream of water entering the latter. When the diaphragm is seated on the valve seat 20, as by movement of the float ball to its upper predetermined position by the raising of the water level in the tank, the flow of water through passage 51 will cease whereupon any water in the adjacent part or refill pipe 52 will flow out through the openings 55 and air will enter passage 51. Thus, any syphoning action which might otherwise occur is effectively prevented by this means of draining water out of the refill pipe and admitting air.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A ball cock valve comprising an inlet pipe, a valve housing enclosing the upper open outlet end of said pipe, a float actuated diaphragm in the housing for controlling the flow of liquid through said pipe, a hollow lateral extension on the housing having downwardly and upwardly extending hollow projections, an aerator in the downwardly extending projection, a ball chain extending through said aerator, a fitting having an enlarged portion seated on said lateral projection around said upwardly extending projection, and having openings thereinto near the lateral projection and a refill tube on the upper end of said fitting.

2. A ball cock valve comprising an inlet pipe, a valve housing enclosing the upper open outlet end of said pipe, a float actuated diaphragm in the housing for controlling the flow of liquid through said pipe, a hollow lateral extension on the housing having an upwardly extending hollow projection, a fitting having an enlarged portion seated on said lateral projection around said upwardly extending projection and having openings thereinto near the lateral extension and a refill tube on the upper end of said fitting.

3. A ball cock valve comprising an inlet pipe, a valve housing enclosing the upper open outlet end of said pipe, a float actuated diaphragm in the housing for controlling the flow of liquid through said pipe, a hollow lateral extension on the housing having downwardly and upwardly extending hollow projections, an aerator in the downwardly extending projection, a fitting having an enlarged portion seated on said lateral projection around said upwardly extending projection and having openings thereinto near the lateral projection and a refill tube on the upper end of said fitting.

4. The combination of elements set forth in claim 3 in which the downwardly extending hollow projection has an outlet at its lower end and in which the projection is provided with a ball chain extending through said outlet.

References Cited by the Examiner

UNITED STATES PATENTS

| 2,229,600 | 1/41 | Park | 251—118 |
| 2,235,299 | 3/41 | Park | 251—118 X |
| 2,300,466 | 11/42 | Peterson et al. | 137—441 X |
| 2,587,032 | 2/52 | Delany | 137—436 |
| 2,655,172 | 10/53 | Owens | 137—216 X |
| 2,722,229 | 11/55 | Wentz | 137—216 |

FOREIGN PATENTS 1,053,228  9/53  France.

M. CARY NELSON, *Primary Examiner.*

ISADOR WEIL, *Examiner.*